(12) United States Patent
Wright et al.

(10) Patent No.: US 8,037,512 B2
(45) Date of Patent: Oct. 11, 2011

(54) PROTECTION OF PRIVACY DATA

(75) Inventors: Benjamin L. Wright, Dallas, TX (US);
Douglas L. Peckover, Dallas, TX (US)

(73) Assignee: Paradox Technical Solutions LLC,
Wilmington, DE (US)

( * ) Notice: Subject to any disclaimer, the term of this patent is extended or adjusted under 35 U.S.C. 154(b) by 1052 days.

(21) Appl. No.: 11/097,974

(22) Filed: Apr. 1, 2005
(Under 37 CFR 1.47)

(65) Prior Publication Data
US 2005/0273842 A1 Dec. 8, 2005

Related U.S. Application Data

(60) Provisional application No. 60/559,415, filed on Apr. 2, 2004.

(51) Int. Cl.
*G06F 21/00* (2006.01)

(52) U.S. Cl. ............................................. 726/4; 726/26

(58) Field of Classification Search ........................ 726/4
See application file for complete search history.

(56) References Cited

U.S. PATENT DOCUMENTS

| 6,633,630 | B1 * | 10/2003 | Owens et al. | 379/93.24 |
|---|---|---|---|---|
| 7,076,558 | B1 * | 7/2006 | Dunn | 709/229 |
| 7,185,357 | B1 * | 2/2007 | Wong et al. | 726/1 |
| 2003/0014654 | A1 * | 1/2003 | Adler et al. | 713/200 |
| 2003/0158960 | A1 * | 8/2003 | Engberg | 709/237 |

OTHER PUBLICATIONS

Wright, B. "*The Law of Electronic Commerce, EDI, FAX, and E-Mail: Technology, Proof, and Liability*", Little, Brown and Company, © 1991 by Benjamin Wright (32 pages), 1991.
Wright, B. *Disavow P3P Liability—Deploy Cookies with Legal Peace of Mind under Internet Explorer 6,:*, © 2001-2002 by Benjamin Wright (31 pages), May 2002.

* cited by examiner

*Primary Examiner* — Gilberto Barron, Jr.
*Assistant Examiner* — Simon Kanaan

(57) ABSTRACT

A method is provided for separating people from direct access to personally identifiable information. The method involves use of a rules-based section which selectively blocks access to personally identifiable information where the access fails to comply with specified rules, and which selectively permits access to personally identifiable information where the access abides with the specified rules.

19 Claims, 1 Drawing Sheet

PROTECTION OF PRIVACY DATA

This application claims the priority under 35 U.S.C. §119 of provisional application No. 60/559,415 filed Apr. 2, 2004.

FIELD OF THE INVENTION

This invention relates generally to protection of privacy and, more particularly, to protection of personally identifiable information.

BACKGROUND

Data management is in crisis. Private data is subject to abuse, and legal punishments for the leakage of data are in ascendancy. Today, personally identifiable information (PII) is just as valuable as money or intellectual property. Identifiers such as name, postal address, e-mail address, social security number, credit card number and so on, need to be managed and guarded with the same diligence afforded other types of precious assets. In the past PII was not so valuable. But in today's information society, where institutions like banks deal with individuals through telecommunications, PII is critical for knowing who is who and what their reputation is.

One problem is that, if someone can steal PII, they can profit from it. They can masquerade as some other person, for example by taking out a loan or renting an apartment in the person's name. This is often referred to as identity theft.

Identity theft has, in just the past few years, become rampant. The U.S. Federal Trade Commission now estimates that a staggering 10 million Americans were victims of identity theft in the 12 month period preceding September, 2003. To business, the cost of identity theft during those 12 months has been estimated to be $47.6 billion. Further, it has been estimated that this is on its way to becoming $2 trillion.

For criminals, a growing source of access to PII is through computer break-ins. Incidents of computer break-ins are rising sharply, and the public is unhappy about it. Legislators and government watchdogs are taking action. Businesses are paying real dollars.

As one example, California Senate Bill 1386 provides that people holding PII in electronic form must give prompt notice to any California resident whose data is reasonably believed to have been compromised. Under Senate Bill 1386, Wells Fargo spent millions of dollars in late 2003 and early 2004 to give notice and support to 200,000 customers after a criminal stole a laptop computer containing their names and account information. Since July, 2003, numerous other institutions have been forced to notify data subjects about computer burglaries. These include Arkansas-based Acxiom, the University of California at Berkeley, and Equifax Canada.

In March, 2004, Softbank (Japan's largest broadband ISP) notified its 4.51 million current and former subscribers that someone had breached the security of its customer database. To compensate customers, the company dedicated $37.8 million for free services, and executives agreed to cut their salaries for the year. In August 2002, the New York Attorney General forced Ziff-Davis to pay $125,000 after a hacker broke into its database of online game customers. The attorney general took action under the state's deceptive trade practices law.

Ligand Pharmaceuticals settled a common-law negligence lawsuit brought by 30 employees who suffered identity theft after their names, birth dates, addresses and social security numbers were stolen from company records.

In late 2003, the California legislature enacted another law, Senate Bill 1, which provides specific monetary penalties for financial institutions that negligently allow PII to get out.

These developments are alarming, and it is expected that the future will bring more lawsuits, and more new laws. Information technology has brought the situation to a point of crisis. There is a need for ways to manage personal information in ways that better promote the interests of all parties.

DETAILED DESCRIPTION

Figure 1:
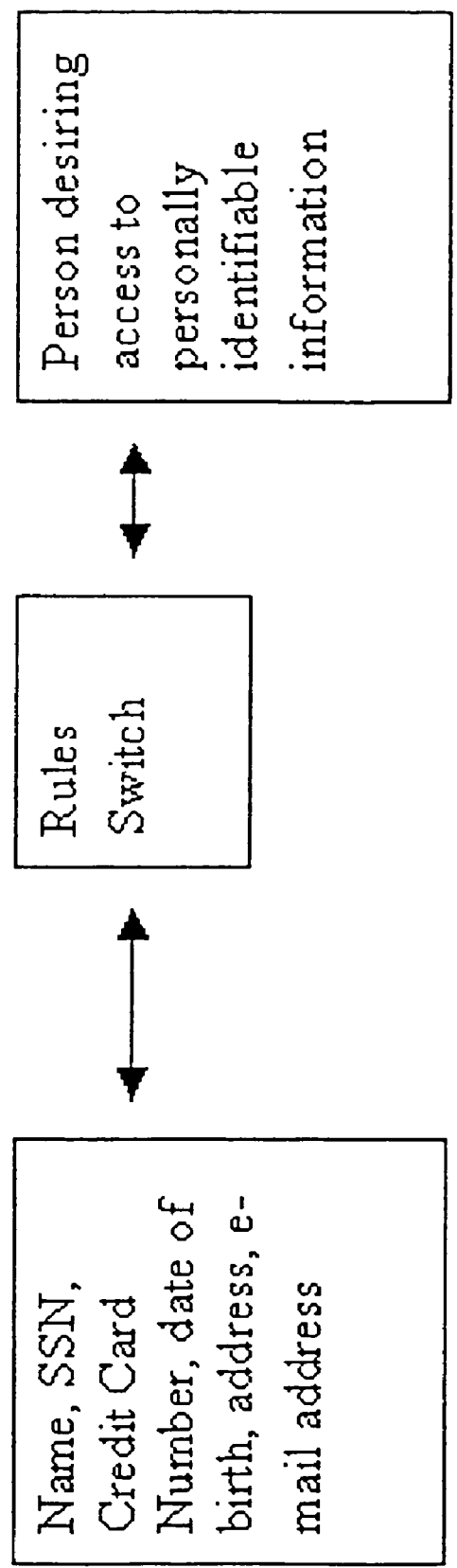
FIG. 1 is a block diagram showing an embodiment which includes aspects of the invention.

FIG. 1 depicts a new technology for separating people from direct access to personally identifiable information (PII). It can be the basis for many different approaches to managing data in conformance with society's insistence on privacy. It involves a separation of duties, and protects PII (or any other data to be kept secret) by separating people from direct access to PII. The separator is a rules switch, which is implemented in the center block in the diagram of FIG. 1.

The rules switch is software that is entrusted to the hands of someone other than a person who wants to use PII. The rules switch can be viewed as a form of agent. The owner of the PII instructs the agent to allow knowledge and use of the PII only according to rules which the owner specifies. The agent is designed so that it blocks use of or access to PII if the use or access fails to abide by the rules. The agent empowers the owner. This technology has many different applications, some of which are described below.

A purpose of the rules switch in the center of the diagram is to protect the identity of people on the left of the diagram, and to permit persons on the right of the diagram to pass information to persons on the left without knowing of their true identity, and/or to have access to identifying information about any person on the left side only when rules set by the person on the left have been satisfied. That is, a person on the right of the diagram does not have unrestricted access to the PII on the left side of the diagram. However, it would be highly beneficial if, under certain limited circumstances, a person on the right could have access to the rules in the rules switch. For example, people on the right might be given limited access to information about preferences of people on the left, so that the needs of the people on the left could better be served without violating anyone's privacy.

Some considerations relating to this technology include:

1. It permits persons on the left to define a personal privacy policy by specifying appropriate rules, and helps others such as persons on the right and Web site owners to abide by the privacy policy of each person on the left.

2. It can be used for "black-listing" data in order to prevent data sharing when not permitted by the person on the left.

3. It permits notification when a relationship is about to expire. This would give a person on the right a chance to notify a person on the left, and provide a renewal incentive before the relationship lapses.

4. It would permit a person on the right to offer special preferential treatment to a person on the left of the diagram, based on individual preferences or demand (where the individual preferences or demand are collected in a private manner, for example as described in U.S. Pat. No. 6,119,101).

5. Tools could automatically audit relationships on the right, and could periodically send the results to the insurance company of a person on the right, so that reduced director's, officer's, and business liabilities could be reflected in lower monthly premiums.

Note that a dialogue between the rules switch and a person on the right could be initiated by the rules switch (which might indicate that "your relationship with this person on the left is about to expire"), or could be initiated by a person on the right (who might ask for identification of "any of my relationships which are about to expire"). References to the people on the left are virtual and unique for each relationship, and do not contain any PII.

1) First Application—Virtual Information

The rules switch technology mentioned above would permit the provision of a service that allows individuals to establish virtual information, such as virtual e-mail addresses, that protect them from spam and phishing. (Phishing is a scam that hackers use to trick Internet users into divulging their passwords, credit card numbers and/or social security numbers. The hacker sends the victim official-looking e-mail, claiming to be from a business that the victim patronizes, and insisting that the victim clear up a "problem" by re-confirming the requested information.)

In the case of a virtual e-mail address, when a customer gives someone else, such as a merchant, an e-mail address, he would use the service and rules switch to generate a virtual e-mail address and to establish the rules associated with that address. This virtual e-mail address can be used only for receiving e-mail for the purpose established by the customer. Any e-mail sent to this virtual e-mail address must comply with the rules in order to then be transmitted on to the customer's inbox at the customer's actual e-mail address. Noncompliance means there will be no delivery to the customer. Thus, for example, if the customer specifies that a virtual address can only be used by a specified merchant for 6 months, then the rules switch will block any e-mail sent to that address from anyone other than the specified merchant, and will block all e-mail after 6 months.

Another similar type of virtual information is a virtual phone number. This would permit a person to be issued a unique virtual phone number for each relationship. When the virtual phone number is called, the phone company would check the rules switch, and the rules switch would either block the call, or forward the call to the person's real phone number (or an alternative phone number), all as defined by the rules in the switch. The rules for a virtual phone number could include such things as an expiration date, restriction of incoming calls to only a certain number (i.e. "do not share"), forward selectively to one of two or more different numbers based on the rules (for example based on the time of day), and go to a message under specified circumstances.

2) Second Application—Internal Security within an Enterprise

A second application for the technology is to protect PII inside an enterprise, such as a bank, a hospital or a government agency. This application can help the enterprise comply with the demanding new family of data security laws that includes HIPAA, Gramm-Leach-Bliley, and California Senate Bills 1 and 1386. Firms that conduct business in Europe or in the Pacific Rim must also comply with the more stringent EU Data Directive, or one of its derivatives.

Although an enterprise may be required by law to possess certain PII, rarely do particular staff members need access to all of that PII. Normally, any given staff member needs to see only selected aspects of PII, and the novel technology discussed here can facilitate that under restrictions. A rules switch of the type shown in FIG. 1 can cost-effectively enforce these restrictions, by setting rules for access.

For example, for a bank customer, the particular elements of PII (name, social security number, account number, address, etc.) could be split into separate databases that do not cross reference. The only way to make sense of the different databases would be through the rules switch. The switch might be placed in the hands of a trusted entity, such as the bank's security department. If an authorized staff member needed access to name and address data for Jane Doe, then the staffer could obtain through the rules switch a single-use key for accessing that information. Only that staff member could use the key, and only according to the time and other constraints specified for the key. No one lacking a key would be able to use the bank's data to link Jane Doe with her address or her account number. Sensitive information would be accessed only on a need to know basis.

A burglar recently stole a personal computer from insurer TriWest Healthcare. The hard drive of the computer held 562,000 names, and the associated social security numbers. The company is now fighting a class-action lawsuit. In contrast, if TriWest database been protected with the rules switch of FIG. 1, the burglar could not have made sense of the data on the hard drive.

3) Third Application—Reverse Privacy Policy

Typically, a web merchant will publish a privacy policy that really doesn't provide privacy at all. Instead, it informs the customer that he or she will be accorded little or no privacy, and that the merchant's Web site will be free to share the customer's information. In contrast, a customer using the rules switch service would have the capability to reverse the tables by legally informing the merchant that the customer insists on privacy. This "reverse privacy policy" will attract customers to those ISPs and other partners who offer the rules switch as a service.

The following is one example of how the reverse privacy policy could work:

1. When a customer using the rules switch service places a standard credit card transaction with an online merchant, or has an e-mail relationship with that merchant, the merchant is sent an Internet Uniform Resource Locator (URL), and a key with the user's info. This can be sent by filling in a comment field on the merchant's Web site, can be sent via e-mail to the Web site, or can be phoned to the merchant, either manually or by an auto-dialer. Note that this notification process may repeat until the merchant acknowledges receipt of the privacy terms set forth below.

2. The URL might be www.abcdefgh.com/terms. At that URL there would be a statement such as:

My Terms

As the customer, I hereby demand that the merchant and its agents and service providers (collectively "the Merchant") protect my private information and secure it from unauthorized use. One reason is that credit card processors are vulnerable. For example, in February 2003, a hacker breached the database of DPI Merchant Services, a major credit card processor, exposing data on 8 million credit cards.

I demand that the Merchant keep my information only for the period of time required to process the specific purchase I made, and that the merchant use the information only to process that transaction. I demand that the Merchant not use or share my information for any other purpose. When the transaction is completed, I demand that the Merchant immediately delete from its records my name, address and telephone number.

XYZ Company can help you, the Merchant, protect my privacy. XYZ Company can gave you a unique transaction key. As explained at the Web site www.abcdefgh.com/explanation, you can use that unique transaction key to access my name, address and phone number, but only to the extent necessary to process and complete the credit card transaction for which the key was given.

My terms as stated above override any terms in the Merchant's privacy policy or terms of service. I hereby reject the Merchant's privacy policy and/or terms of service to the extent that they conflict with my privacy policy and terms stated above.

This reverse privacy policy serves a variety of goals:

A) It maximizes the consumer's control over his or her data.

B) It promotes the legal interests of the customer. The terms quoted above aim to obligate the merchant to provide security. Instead of the merchant telling the consumer what the terms of privacy are (or are not), the consumer communicates terms of privacy to the merchant.

C) It promotes entities (such as ISPs) that offer this technology to their customers.

4) Fourth Application—Virtual Credit Cards

Consumers could use virtual credit cards to make payments to online merchants. For example, an entity providing the rules switch would partner with one or more financial institutions, which would issue one-time credit card numbers. When a customer makes a credit card payment with a merchant, each unit of information provided to the merchant (name, address, credit card number) would have a one-time use. If a thief took any of the information, it would be worthless to him or her. This protects the consumer, the financial institution, and also the merchant (who typically bears the ultimate cost of the damages resulting from credit card fraud).

Note that the one-time name and address can be used by a participating freight company to deliver the merchandise. In this case, the zip code is correct for tax and freight calculations, but all other personal information can only be accessed by the freight company after the merchandise has been picked up.

5) Fifth Application—Education

Courts have held that a school can be liable for misconduct that harms students on its campus, that a college can be accountable for negligently failing to secure its campus against a rapist, and also that a university can be liable for a murder (where a student told a university psychotherapist that he intended to harm a specific victim and the therapist failed to warn the victim). Schools can be legally accountable for identity theft that occurs after someone breaks into their information systems.

Universities have recently suffered some highly-publicized leaks of social security numbers. For instance, a news source reported that San Diego State University warned more than 178,000 students, alumni and employees that hackers broke into a university computer server where names and social security numbers were stored. In one of two incidents befalling NYU in early 2004, someone from the intramural sports department unwittingly posted student names and social security numbers on a publicly accessible Web site.

The rules switch technology disclosed herein can eliminate the need for people within a campus to have access to critical data like social security numbers. It can facilitate the controlled use of virtual identities for purposes of class registration, dorm room assignments and extra-curricular activities.

For instance, a university registrar might manage student registrations with a rules switch. When student Bob registers for a math class, the registrar gives the professor a single-use identification and e-mail address for Bob. The professor can then use them to communicate with the registrar and with Bob about the class, but if anyone steals them from the professor, the thief would not know Bob's identity or how to reach him.

Other educational benefits are also possible. For example, this can be used to protect students as they enter the job market and are vulnerable to identity theft. The best time to protect against the loss of personal information is before it has started.

6) Sixth Application—Affinity Marketing

Suppose a club or professional association wishes to connect its members with a service provider, such as an Internet movie-on-demand service. The association wants to allow the provider to contact its members, but only for purposes of the movie service, and the association wants to prevent the provider from disclosing information about the members to anyone else, such as another marketer. To do this, the association would give the provider a one-time e-mail address for each member. Under the rules switch technology disclosed herein, this address could be used only once, and only for e-mail coming from the provider. Any e-mail from another source would be blocked.

7) Seventh Application—International Transfer of Data

The European Union's Data Directive inhibits the transfer of personal data from within an EU member to a country with inadequate data security protections under its laws. The Directive recognizes that those protections can be achieved by way of appropriate contracts or other arrangements. The rules switch technology disclosed herein could help facilitate compliance with the Directive.

For example, assume that a company with operations in France wishes to process transactions concerning French citizens in the United States, all in accord with the Directive. Although one option would be for the company to join what is commonly known as the "Safe Harbor", the requirements of the Safe Harbor are demanding and can be expensive. The rules switch technology disclosed herein could provide an alternative. For example, data made available to the U.S. operations could be "de-identified" so that the objectives of the Directive are met. For each French citizen in question, the U.S. operations might be given only a one-time key, which could be used only as a limited proxy for the identity of the citizen. The information about actual identity of the citizen would never leave France.

The rules switch technology restricts the exchange of information with a protected customer. It blocks unwanted messages from a merchant, and it masks from the merchant unnecessary information about the customer. But it does not make for anonymous communications. If a law enforcement authority possessed a search warrant, it could access and analyze the records in the rules switch to ascertain the details of a message. Hence, the rules switch technology is consistent with lawful investigations under laws such as the USA Privacy Act.

8) Eighth Application—Data Sharing within Law Enforcement

On the heels of September 11, state law enforcement agencies proposed to share copious information about criminals and crime under a program called Matrix. But Matrix has been hampered by privacy fears. The rules switch technology discussed herein could help to allay privacy challenges for government-to-government data exchanges, such as Matrix. For example, a state police agency might agree to contribute data about traffic violations in its state, so long as each incident is de-identified in an agreed way so as to prevent use of the data except under specified conditions.

What is claimed is:

1. A tangible computer-readable memory medium having stored thereon instructions that, in response to execution by a computer system, cause the computer system to perform operations comprising:
  storing an actual identifier associated with a first user;
  storing one or more rules indicating whether at least one other user is permitted to communicate with the first user using a virtual identifier, wherein the virtual identifier is not usable to send communications other than by receiving communications addressed to the virtual identifier and forwarding the received communications to the first user via the actual identifier;
  receiving an attempted communication addressed to the virtual identifier;
  determining whether to forward the attempted communication to the first user as a communication addressed to the actual identifier, wherein said determining comprises using at least one of the one or more rules, and wherein the at least one of the one or more rules is based at least in part on an identity of a user that initiated the attempted communication; and
  in response to determining that the attempted communication fails to comply with at least one of the one or more rules, blocking the attempted communication from being delivered to the first user, wherein said determining that the first attempted communication fails to comply is based at least in part on a time at which the attempted communication was initiated.

2. The tangible computer-readable memory medium of claim 1, wherein the operations further comprise:
  generating the virtual identifier for the first user; and
  receiving information indicative of the one or more rules.

3. The tangible computer-readable memory medium of claim 1,
  wherein said storing an actual identifier includes storing an actual e-mail address of the first user;
  wherein said receiving an attempted communication addressed to the virtual identifier includes receiving an e-mail message addressed to a virtual e-mail address; and
  wherein said determining that the attempted communication fails to comply is based at least in part on:
    an e-mail address of a sender of the e-mail message; and
    a time associated with the e-mail message.

4. The tangible computer-readable memory medium of claim 1,
  wherein said storing an actual identifier includes storing an actual phone number of the first user;
  wherein said receiving an attempted communication addressed to the virtual identifier includes receiving a phone call addressed to a virtual phone number; and
  wherein said determining that the first attempted communication fails to comply is based at least in part on:
    a phone number of an initiator of the phone call; and
    a time of day associated with the phone call.

5. The tangible computer-readable memory medium of claim 1, wherein said storing one or more rules includes storing one or more rules that are specific to the first user.

6. A method, comprising:
  a computing system receiving from a third party an attempted communication addressed to a virtual identifier associated with a first user, wherein the virtual identifier is not usable to send communications other than by receiving communications addressed to the virtual identifier and forwarding the received communications to the first user via an actual identifier associated with the first user;
  the computing system determining whether to forward the attempted communication to the first user as a communication addressed to the actual identifier, wherein said determining comprises using at least one of one or more rules that indicate whether at least one other user is permitted to communicate with the first user using the virtual identifier; and wherein the at least one of the one or more rules is based at least in part on an identity of a user that initiated the attempted communication; and
  in response to determining that the attempted communication fails to comply with at least one of the one or more rules, blocking the attempted communication from being delivered to the first user, wherein said determining that the attempted communication fails to comply is based at least in part on a specified time period during which communications from a sender is allowed.

7. The method of claim 6, wherein the method further comprises:
  generating the virtual identifier for the first user; and
  receiving information indicative of the one or more rules.

8. The method of claim 6,
  wherein said forwarding the received communications to the first user via an actual identifier includes forwarding to an actual e-mail address of the first user;
  wherein said receiving an attempted communication addressed to a virtual identifier includes receiving an e-mail message addressed to a virtual e-mail address; and
  wherein said determining that the attempted communication fails to comply is based at least in part on:
    an e-mail address of a sender of the e-mail message; and
    a time associated with the e-mail message.

9. The method of claim 6,
  wherein said forwarding the received communications to the first user via an actual identifier includes forwarding to an actual phone number of the first user;
  wherein said receiving an attempted communication addressed to a virtual identifier includes receiving a phone call addressed to a virtual phone number; and
  wherein said determining that the first attempted communication fails to comply is based at least in part on:
    a phone number of an initiator of the phone call; and
    a time of day associated with the phone call.

10. The method of claim 6, wherein said using at least one of one or more rules includes using at least one rule that is specific to the first user.

11. A system, comprising:
  a processor;
  a port coupled to a network and the processor;
  first memory configured to store representations of:
    an actual identifier for a first user;
    a virtual identifier associated with the first user, wherein the virtual identifier is not usable to send communications other than by receiving communications addressed to the virtual identifier and forwarding the received communications to the first user via the actual identifier; and
    one or more rules indicating whether at least one other user is permitted to communicate with the first user by using the virtual identifier; and
  second memory coupled to the processor, wherein the second memory is configured to store program instructions executable by the system to cause the system to:

receive an attempted communication addressed to the virtual identifier;

determine whether to forward the attempted communication to the first user as a communication addressed to the actual identifier, wherein said determining comprises using at least one of the one or more rules that is based at least in part on an identity of a user that initiated the attempted communication; and in response to determining that the attempted communication fails to comply with at least one of the one or more rules, block the attempted communication from being delivered to the first user, wherein said determining that the first attempted communication fails to comply is based at least in part on a time at which the attempted communication was initiated.

12. The system of claim 11, wherein the program instructions are further executable to cause the system to receive information indicative of the one or more rules.

13. The system of claim 11, wherein the virtual identifier is a virtual e-mail address;

wherein the first memory is configured to store representations of an actual identifier that is an actual e-mail address of the first user;

wherein the program instructions are executable to cause the system to receive an attempted communication that is an e-mail message addressed to a virtual e-mail address; and wherein said determining that the attempted communication fails to comply is based at least in part on:
an e-mail address of a sender of the e-mail message; and
a time associated with the e-mail message.

14. The system of claim 11, wherein the virtual identifier is a virtual phone number;

wherein the first memory is configured to store representations of an actual identifier that is an actual phone number of the first user;

wherein the program instructions are executable to cause the system to receive an attempted communication that is an attempted phone call addressed to a virtual phone number; and wherein said determining that the attempted communication fails to comply is based at least in part on:
a phone number of an initiator of the phone call; and
a time of day associated with the phone call.

15. The system of claim 11, wherein the first memory is configured to store representations of one or more rules that are specific to the first user.

16. The system of claim 11, wherein the first memory and the second memory are the same.

17. A tangible computer-readable memory medium having stored thereon instructions that, in response to execution by a computer system, cause the computer system to perform operations comprising:

storing an actual identifier associated with a first user, wherein a virtual identifier is associated with the first user;

storing one or more rules indicating whether one or more other users are permitted to communicate with the first user at the actual identifier via the virtual identifier, wherein the first user is unable to access communications at the virtual identifier;

receiving an attempted communication addressed to the virtual identifier;

determining whether to forward the attempted communication to the first user as a communication addressed to the actual identifier, wherein said determining comprises using at least one of the one or more rules, and wherein the at least one of the one or more rules is based at least in part on an identity of a user that initiated the attempted communication; and in response to determining that the attempted communication fails to comply with at least one of the one or more rules, blocking the attempted communication from being delivered to the first user, wherein said determining that the attempted communication fails to comply is based at least in part on a specified time period during which communications from a sender is allowed.

18. A method, comprising:

a computing system receiving from a third party an attempted communication addressed to a virtual identifier associated with a first user;

the computing system determining whether to forward the attempted communication to the first user as a communication addressed to the actual identifier, wherein said determining comprises using at least one of one or more rules that indicate whether at least on other user is permitted to communicate with the first user using the virtual identifier, and wherein the first user is unable to access communications at the virtual identifier; and in response to determining that the attempted communication fails to comply with at least one of the one or more rules, blocking the attempted communication from being delivered to the first user, wherein said determining that the attempted communication fails to comply is based at least in part on a specified time period during which communications from a sender is allowed;

wherein the at least one of the one or more rules is based at least in part on an identity of a user that initiated the attempted communication.

19. A system, comprising:

a processor;

a port coupled to a network and the processor;

first memory configured to store representations of:
an actual identifier for a first user;
a virtual identifier for the first user; and
one or more rules indicating whether at least one other user is permitted to communicate with the first user by using the virtual identifier, wherein the first user is unable to access communications at the virtual identifier; and second memory coupled to the processor, wherein the second memory is configured to store program instructions executable by the system to cause the system to:

receive an attempted communication addressed to the virtual identifier;

determine whether to forward the attempted communication to the first user as a communication addressed to the actual identifier, wherein said determining comprises using at least one of the one or more rules that is based at least in part on an identity of a user that initiated the attempted communication; and in response to determining that the attempted communication fails to comply with at least one of the one or more rules, block the attempted communication from being delivered to the first user, wherein said determining that the first attempted communication fails to comply is based at least in part on a time at which the attempted communication was initiated.

* * * * *

UNITED STATES PATENT AND TRADEMARK OFFICE
CERTIFICATE OF CORRECTION

Page 1 of 1

PATENT NO. : 8,037,512 B2
APPLICATION NO. : 11/097974
DATED : October 11, 2011
INVENTOR(S) : Wright et al.

It is certified that error appears in the above-identified patent and that said Letters Patent is hereby corrected as shown below:

Title page, item (56), under "Other Publications", in Column 2, Line 1, delete "*Commerce, EDI,*" and insert -- *Commerce: EDI,* --.

Title page, item (56), under "Other Publications", in Column 2, Line 5, delete "*Explorer 6,: , ©*" and insert -- *Explorer 6, ©* --.

Column 1, line 2, below title insert -- CROSS-REFERENCE TO RELATED APPLICATION --.

Column 10, line 21, in Claim 18, delete "on" and insert -- one --.

Signed and Sealed this
Nineteenth Day of June, 2012

David J. Kappos
*Director of the United States Patent and Trademark Office*